United States Patent
Cheng et al.

(10) Patent No.: US 9,403,556 B2
(45) Date of Patent: Aug. 2, 2016

(54) WHEEL ASSEMBLY KINEMATIC ENHANCEMENT DEVICE

(71) Applicant: FORD GLOBAL TECHNOLOGIES, LLC, Dearborn, MI (US)

(72) Inventors: James C. Cheng, Troy, MI (US); Yijung Chen, Ypsilanti, MI (US); Derek Board, Ferndale, MI (US); Xiaowei Li, Northville, MI (US); Ping Chen, Troy, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 50 days.

(21) Appl. No.: 14/195,908

(22) Filed: Mar. 4, 2014

(65) Prior Publication Data

US 2015/0251615 A1  Sep. 10, 2015

(51) Int. Cl.
*B62D 21/15* (2006.01)
*B60R 19/54* (2006.01)
*B62D 25/08* (2006.01)
*B60R 19/00* (2006.01)

(52) U.S. Cl.
CPC .............. *B62D 21/152* (2013.01); *B60R 19/54* (2013.01); *B62D 25/08* (2013.01); *B60R 2019/007* (2013.01)

(58) Field of Classification Search
CPC ...... B60R 19/00; B60R 19/02; B60R 19/023; B60R 19/54; B60R 19/34; B60R 2019/007; B60G 2206/016; B62D 21/152; B62D 25/08
See application file for complete search history.

(56) References Cited

U.S. PATENT DOCUMENTS

| | | | | |
|---|---|---|---|---|
| 2,519,429 A | * | 8/1950 | Brandvold | 293/143 |
| 2,845,144 A | * | 7/1958 | Bohn | 188/375 |
| 3,843,180 A | * | 10/1974 | Alexander | 293/150 |
| 3,884,517 A | * | 5/1975 | Davidson | 293/150 |
| 3,907,352 A | * | 9/1975 | Spain et al. | 293/152 |
| 4,333,674 A | * | 6/1982 | Buettner et al. | 293/120 |
| 5,275,436 A | * | 1/1994 | Pomero | 280/784 |
| 5,348,113 A | * | 9/1994 | Drvota et al. | 180/271 |
| 6,460,889 B2 | * | 10/2002 | Iyanagi | B62D 21/152 280/784 |
| 6,511,119 B2 | | 1/2003 | Takase et al. | |
| 6,994,374 B2 | * | 2/2006 | Miyasaka | 280/784 |
| 7,677,616 B2 | | 3/2010 | Taniguchi et al. | |
| 7,819,218 B2 | * | 10/2010 | Eichberger et al. | 180/274 |
| 8,398,153 B1 | | 3/2013 | Dandekar et al. | |
| 8,398,154 B1 | * | 3/2013 | Nusier et al. | 296/187.1 |
| 8,414,041 B2 | | 4/2013 | Paare et al. | |
| 8,807,632 B2 | * | 8/2014 | Ramoutar et al. | 296/187.09 |
| 8,857,555 B2 | * | 10/2014 | Paintmayer et al. | 180/274 |
| 8,985,258 B1 | * | 3/2015 | Midoun et al. | 180/274 |
| 8,985,671 B1 | * | 3/2015 | Lei et al. | 296/133 |
| 9,004,216 B1 | * | 4/2015 | Baccouche et al. | 180/274 |
| 9,016,767 B2 | * | 4/2015 | Sotoyama | B62D 21/152 296/187.09 |
| 2004/0200347 A1 | * | 10/2004 | Grosch | 89/36.09 |
| 2012/0248820 A1 | | 10/2012 | Yasui et al. | |
| 2013/0069377 A1 | | 3/2013 | Qu et al. | |
| 2014/0091585 A1 | * | 4/2014 | Ramoutar et al. | 293/133 |

* cited by examiner

*Primary Examiner* — Paul N Dickson
*Assistant Examiner* — Timothy Wilhelm
(74) *Attorney, Agent, or Firm* — Frank A. MacKenzie; MacMillan, Sobanski & Todd, LLC

(57) ABSTRACT

An automotive vehicle includes a wedge fixed by shear connections to a structural member. Upon application of a rearward force, the wedge shears free and moves between the structural member and a wheel assembly where it rotationally displaces a vehicle tire. The rearward force also laterally displaces the body of the vehicle. The wedge is tethered to the structural member.

16 Claims, 3 Drawing Sheets

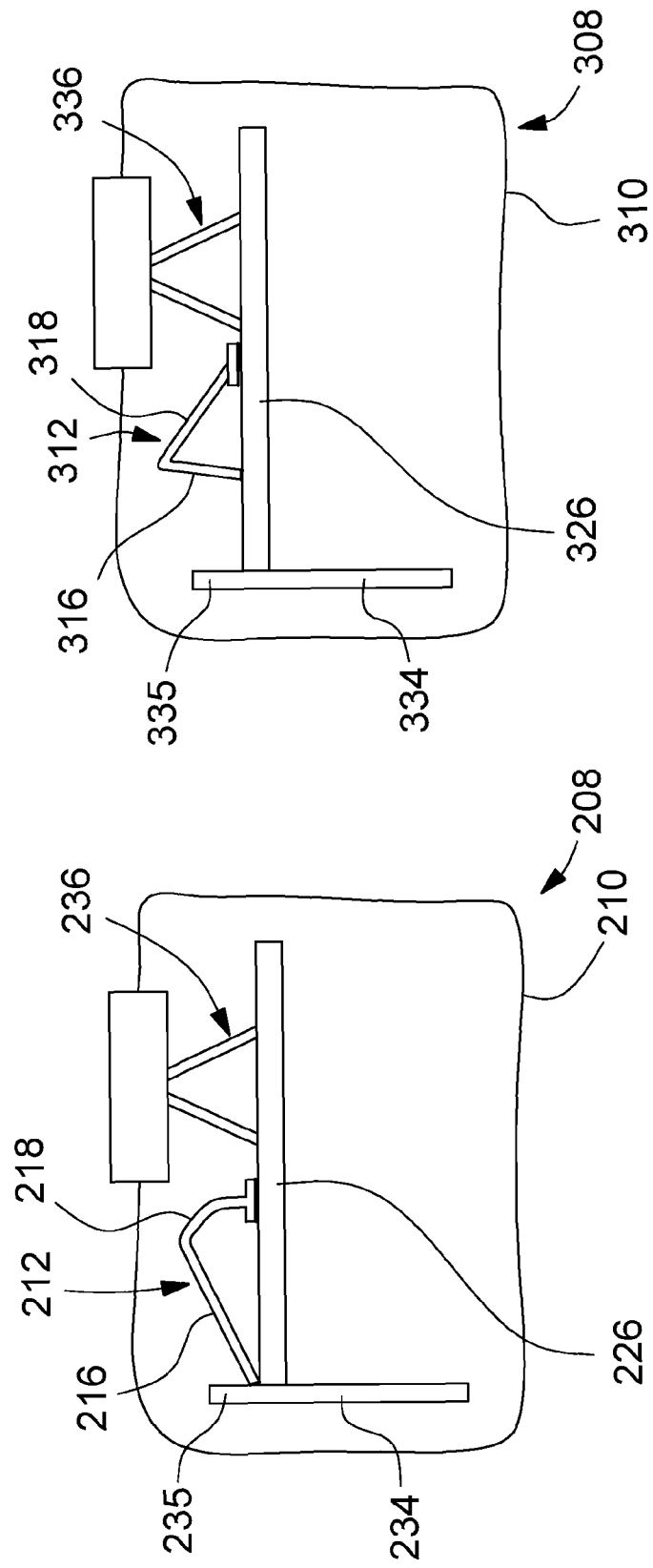

WHEEL ASSEMBLY KINEMATIC ENHANCEMENT DEVICE

BACKGROUND OF INVENTION

The present invention relates to a kinematic enhancement device for automotive wheel assemblies.

In an impact event, automotive components may be displaced due to applied forces. An automotive vehicle may include a structural frame and body, which may absorb energy in the event of an impact event. A wheel assembly mounted outboard of a frame rail may become displaced during the impact event and the displacement may be in an orientation that is less desirable than displacements in other orientations or directions.

SUMMARY OF INVENTION

An embodiment contemplates an automotive vehicle. The vehicle includes a body having a structural member. A wedge is fixed by a shear connection to the member in front of a vehicle wheel assembly. The wedge is configured to, when subjected to a rearward force, shear free from the member and move between the body and wheel assembly to displace the wheel assembly from the body.

Another embodiment contemplates a method of deflecting a vehicle collision. A rearward force shears a wedge from a structural member of an automotive vehicle body. The wedge is moved rearward to displace a wheel assembly from the body.

An advantage of an embodiment is that the wheel assembly is displaced outboard of the body, which may be desirable during an impact event.

BRIEF DESCRIPTION OF DRAWINGS

FIG. 3 is a schematic view of an automotive vehicle.
FIG. 4 is a schematic view of an automotive vehicle.

DETAILED DESCRIPTION

Figure 1:
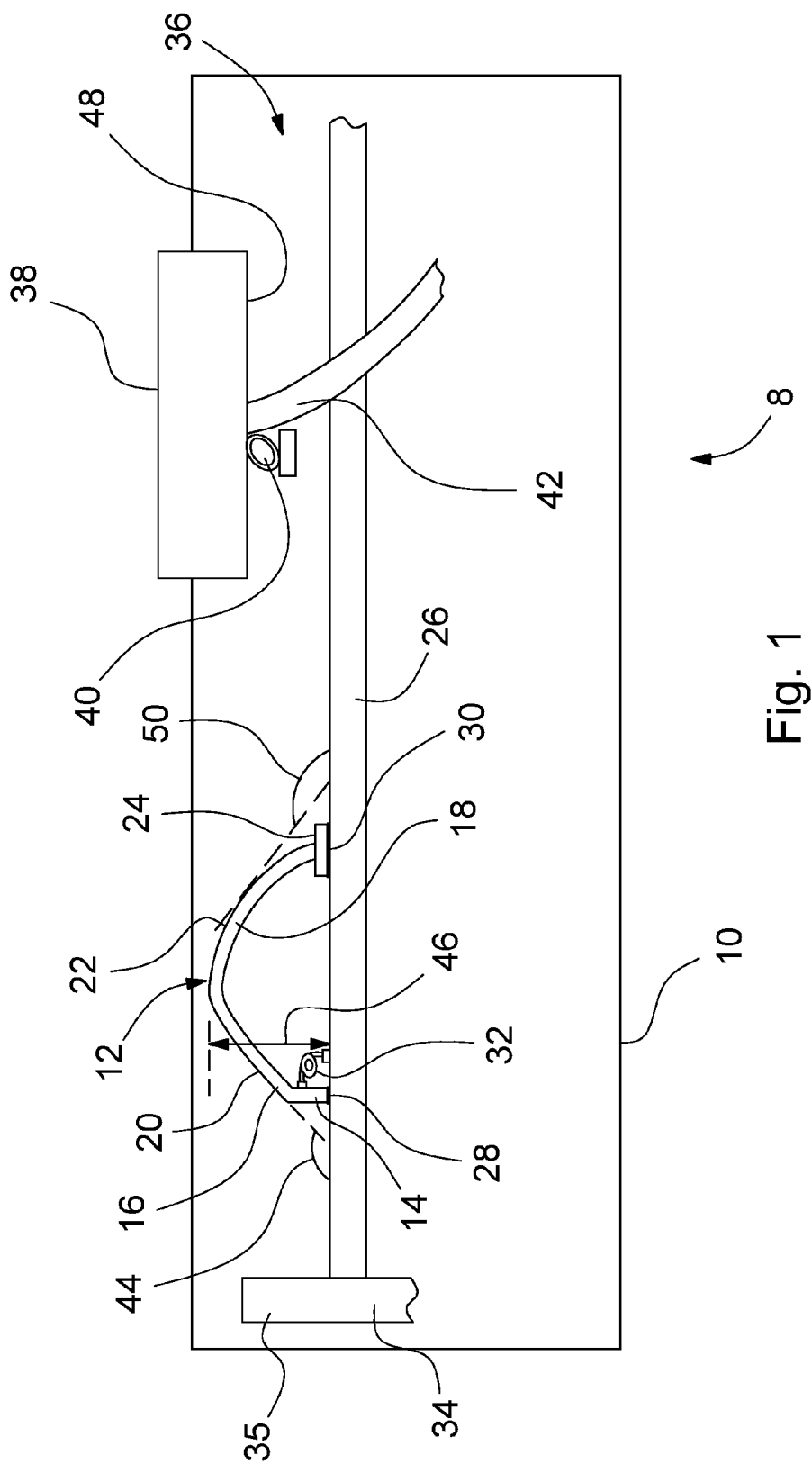
FIG. 1 is a schematic view of an automotive vehicle.

FIG. 1 schematically illustrates an automotive vehicle 8 having a body 10 and a kinematic wedge 12. Illustrated is a front right corner of the vehicle 8. As understood by one skilled in the art, the kinematic wedge 12 illustrated for the front right corner may also be included at a left front corner of the vehicle 8 or elsewhere in the vehicle 8.

The kinematic wedge 12 has a stub leg 14, a first leg 16, and a second leg 18. The first leg 16 has a first face 20 and the second leg 18 has a second face 22. The second leg 18 has a closing piece 24. The closing piece 24 is a plate interposed between the second leg 18 and a structural member 26 that distributes forces applied to the wedge 12 to the structural member 26. The wedge 12 is fabricated from a suitable material such as high grade steel and is fabricated to standards for an automotive vehicle structural frame.

The stub leg 14 and the closing piece 24 are fixed to the structural member 26 by first and second shear connections 28 and 30, respectively. The first and second shear connections 28 and 30 may be any appropriate fixing means known to one skilled in the art to produce a shear connection. For example, the first and second shear connections 28 and 30 may be weld connections or bolt connections. Alternatively, the wedge 12 may be fixed to the structural member 26 by only the shear connection 28 with the second leg 18 being cantilevered or the wedge 12 may be fixed to the structural member 26 by only the shear connection 30 with the stub leg 14 and first leg 16 being cantilevered. Additionally, the wedge 12 is secured to the structural member 26 (or other vehicle structure) by a tether 32. The tether 32 is a flexible cable that limits movement of the wedge 12 when the first and second connections 28 and 30 are sheared free.

The structural member 26 may be part of the structural frame for the vehicle 8. For example, the structural member 26 may be a longitudinally extending side rail. A laterally extending bumper rail 34 may be mounted to a frontend of the side rail. Alternatively to the first connection 28, then, the wedge 12 may be fixed by a shear connection to the bumper rail 34. The bumper rail 34 may have a bumper overhang 35 extending laterally outboard of the structural member 26. The bumper overhang 35 may be considered a non-structural element in regards to absorbing impact loads.

Also included in the vehicle 8 is a wheel assembly 36. As illustrated, the wheel assembly 36 is a front right wheel. As understood by one skilled in the art, the wheel assembly 36 may be for a different wheel location on the vehicle 8 than the front right wheel. As illustrated, the wheel assembly 36 is for a rear wheel drive vehicle. As understood by one skilled in the art, the wheel assembly 36 may also be for other powertrains such as front or all wheel drive vehicles. The wheel assembly 36 may be a typical automotive vehicle wheel assembly as understood by one skilled in the art and may include a tire 38, a strut 40, and an additional suspension and steering assembly 42. The additional suspension and steering assembly 42 may be typical of the attachment points known to one skilled in the art for the typical wheel assembly. For example, additional suspension and steering assembly 42 may include suspension linkages, control arms, steering knuckles, etc.

An obtuse first angle 44 is formed between the first face 20 and the member 26. A lateral span 46 extends from the member 26 to beyond an inboard face 48 of the tire 38. An obtuse second angle 50 is formed between the second face 22 and the member 26.

Figure 2:
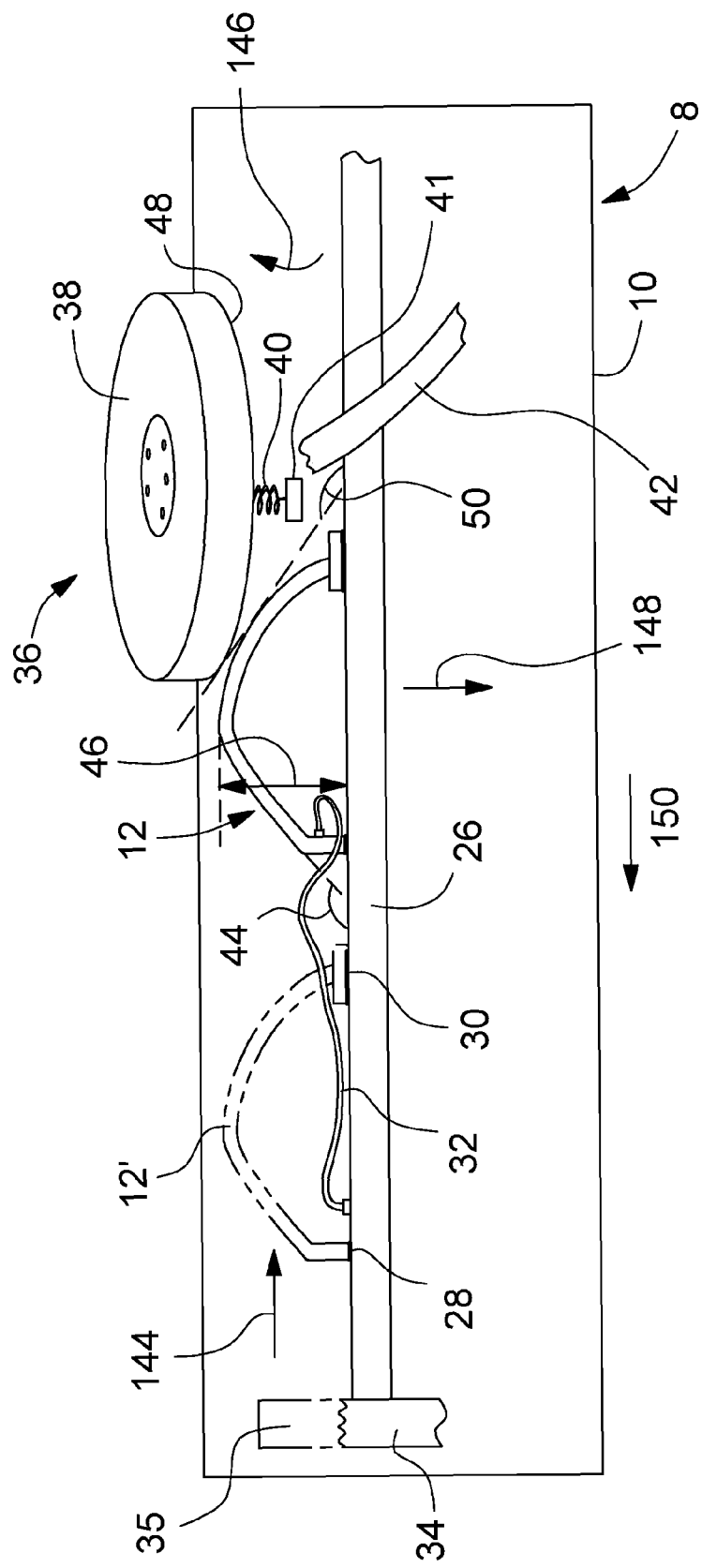
FIG. 2 is a schematic view of an automotive vehicle.

FIG. 2 will now be discussed with reference to FIG. 1. FIG. 2 schematically illustrates the wedge 12 of FIG. 1 having sheared free and moved rearward between the structural member 26 and the tire 38 due to an impact event.

A rearward directed force 144 has been applied by an object to the vehicle 8 outboard of the member 26. The rearward force has deformed or sheared the bumper overhang 35 free from the bumper rail 34 (the former location of the bumper overhang 35 is shown by phantom lines). The rearward force 144 has also moved the wedge 12 from a pre-impact position 12' (shown in phantom) to between the structural member 26 and the wheel and tire 38. The object causing the rearward force 144 has sheared free the first and second connections 28 and 30, allowing the wedge 12 to be driven rearward along the structural member 26. However, the wedge 12 remains tethered to the member 26 by the tether 32, which prevents the wedge 12 from complete separation from the vehicle 8 after being sheared free.

The wedge 12, having moved from the position 12' to the illustrated position between the structural member 26 and the tire 38, displaces the tire 38 by rotating the tire 38 up and away from the body 10 in a rotational direction 146. The tire 38 rotates about a connection point 41 between the strut 40 and the body 10. The rotation of the tire 38 may sever portions of the additional suspension 42.

The rearward force 144 may also displace the body 10 in a lateral direction 148. For example, if the body 10 is moving in a forward direction 150 when the rearward force 144 is applied, then in addition to moving the wedge 12 rearward to displace the tire 38 in the rotational direction 146, the rearward force 144 may also displace the body 10 in a lateral direction 148.

The lateral direction 148 is generally perpendicular to the forward direction 150. Alternatively, if the body 10 is not moving in the forward direction 150 when the rearward force 144 is applied, in addition to the wedge 12 being moved rearward and rotationally displacing the tire 38, then the body 10 may still be displaced in the lateral direction 148.

By the first angle 44 being obtuse, the rearward force 144 (caused by an object impacting the wedge 12) will have components that both move the wedge 12 rearward and laterally displace the body 10 in the lateral direction 148. For example, the first angle 44 may be 30°.

Extension of the wedge 12 beyond the inboard face 48 ensures that the wedge 12 will make contact with the wheel assembly 36 so that the wedge 12 rotationally displaces the tire 38. Reducing the second angle 50 towards a right angle increases the rotational displacement of the wheel assembly 36. To rotationally displace the wheel assembly 36 as desired, the second angle 50 should not be acute.

Continued application of the rearward force 144 may move the wedge 12 beyond the position illustrated in FIG. 2. Moving the wedge 12 beyond the position illustrated in FIG. 2 may continue to rotationally displace the tire 38 and laterally displace the body 10 so that the tire 38 is rotationally displaced clear of the body 10.

FIG. 3 schematically illustrates an automotive vehicle 208 having a body 210 and a kinematic wedge 212. Because FIG. 3 is a variation of FIG. 1, like reference numerals designate corresponding parts in the drawings and detailed description thereof will be omitted. The wedge 212 has a straight first leg 216 fixed to a bumper rail 234.

FIG. 4 schematically illustrates an automotive vehicle 308 having a body 310 and a kinematic wedge 312. Because FIG. 3 is a variation of FIG. 1, like reference numerals designate corresponding parts in the drawings and detailed description thereof will be omitted. The wedge 312 has a straight first leg 316 nearly perpendicular to a structural member 326 and a second leg 318 that is straight.

While certain embodiments of the present invention have been described in detail, those familiar with the art to which this invention relates will recognize various alternative designs and embodiments for practicing the invention as defined by the following claims.

What is claimed is:

1. An automotive vehicle comprising:
   a body having a structural member;
   a wedge fixed, by a shear connection to the member, in front of a vehicle wheel assembly, the wedge configured to shear free from the member when subjected to a rearward force and axially slide rearward between the body and wheel assembly to displace the wheel assembly outward from the body.

2. The vehicle of claim 1 wherein the wedge is additionally secured to the structural member by a tether that stretches rearward to remain attached between the wedge and the member when the connection shears free.

3. The vehicle of claim 1 wherein the wedge is shaped with a generally triangular shape and configured to be held against the member by the rearward force as the wedge slides axially rearward.

4. The vehicle of claim 1 wherein the wedge has first and second faces, the first face being configured to receive the rearward force and the second face configured to contact an inboard side of the wheel assembly to displace the wheel assembly.

5. The vehicle of claim 4 wherein the member extends longitudinally and the first face has an obtuse angle from a forward outboard face of the structural member.

6. The vehicle of claim 4 wherein the wedge is configured such that decreasing an angle between the second face and the structural member increases laterally outward displacement of the wheel assembly.

7. The vehicle of claim 1 wherein the member is a longitudinally extending frame rail and the wedge is configured to mount to an outboard face of the rail and to axially slide along the rail.

8. The vehicle of claim 1 wherein the member includes a bumper rail to which a forward leg of the wedge is fixed and the wedge is configured to slide axially along a frame rail when sheared from the bumper rail.

9. The vehicle of claim 1 wherein the wedge includes a first leg extending outwardly and rearwardly from a first connection of the shear connection and a second leg extending inwardly and rearwardly from the first leg to a second connection of the shear connection.

10. The vehicle of claim 1 wherein the wedge includes a first leg extending outwardly from the connection to the member, and a tether attached between the first leg and the member that stretches rearward to remain attached when the connection shears free.

11. The vehicle of claim 10 wherein the wedge includes a second leg extending outward and forward from the connection to the first leg.

12. The vehicle of claim 1 wherein the shear connection is a weld that secures the wedge to the member.

13. A method of deflecting a vehicle collision comprising:
    shearing a wedge free from a longitudinally extending structural member of an automotive vehicle body with a rearward force, the wedge mounted to a lateral surface of the member;
    axially sliding the sheared wedge rearward along the member to displace a wheel assembly outward from the body.

14. The method of claim 13 wherein the wedge is additionally fixed to the member by a tether connected between the lateral surface of the member and the wedge that remains attached when the wedge shears free.

15. The method of claim 13 wherein the wheel assembly comprises a tire connected to the body by a strut and the wedge displaces the tire by contacting an inboard portion of the tire, rotating the tire about a connection point between the strut and body.

16. The method of claim 13 wherein the wheel assembly is displaced in a first direction and the body is displaced in a second direction.

* * * * *